United States Patent [19]

van Ooij et al.

[11] Patent Number: 5,108,793

[45] Date of Patent: Apr. 28, 1992

[54] STEEL SHEET WITH ENHANCED CORROSION RESISTANCE HAVING A SILANE TREATED SILICATE COATING

[75] Inventors: Wim J. van Ooij, Fairfield; Ashok Sabata, Cincinnati, both of Ohio

[73] Assignee: Armco Steel Company, L.P., Middletown, Ohio

[21] Appl. No.: 632,858

[22] Filed: Dec. 24, 1990

[51] Int. Cl.⁵ .............................. B05D 3/02
[52] U.S. Cl. ........................ 427/327; 422/13; 427/337; 427/387; 427/388.4; 428/632
[58] Field of Search .............. 427/387, 388.4, 327, 427/337; 422/13; 428/632

[56] References Cited

U.S. PATENT DOCUMENTS 4,407,899 10/1983 Hare et al. .......................... 428/626
4,411,964 10/1983 Hare et al. .......................... 428/626

FOREIGN PATENT DOCUMENTS 1937 1/1975 Japan .
50940 4/1977 Japan .

OTHER PUBLICATIONS van Ooij & Sabata, "A Research Look At The Effect Of Pretreatment On The Corrosion Resistance Of Automotive Sheet Steels", Pretreat '90, pp. 5-1 to 5-26, Cincinnati, Ohio, Nov. 6-8, 1990.

Primary Examiner—Michael Lusignan
Attorney, Agent, or Firm—R. J. Bunyard; L. A. Fillnow; R. H. Johnson

[57] ABSTRACT

Steel sheet coated with a nontoxic, relatively insoluble, inorganic, corrosion resistant coating. A silicate coating is formed on a steel sheet by rinsing the sheet for at least 30 seconds in an alkaline aqueous solution containing 0.005 M silicate, 0.005 M metal salt and having a temperature of at least 25° C. The sheet is dried to form an adherent silicate coating having a thickness of at least 2 nm prior to being treated with an aqueous solution containing 0.5-5 vol.-% silane. If the sheet is painted, the silane film forms an adherent bond between the paint and the silicate coating. A silane treated silicate coating minimizes red rusting on terne coated steel by sealing pin holes. A silane treated silicate coating also provides good corrosion protection and paint adherence on cold-rolled or galvanized steel.

19 Claims, 1 Drawing Sheet

STEEL SHEET WITH ENHANCED CORROSION RESISTANCE HAVING A SILANE TREATED SILICATE COATING

BACKGROUND OF THE INVENTION

This invention relates to a method of protecting steel sheet with a nontoxic, relatively insoluble, inorganic, corrosion resistant coating. More particularly, the invention relates to steel sheet having a silicate coating formed from an aqueous alkaline waterglass solution with the silicate coated sheet treated with an aqueous silane containing solution.

Terne, i.e., lead and lead alloy containing tin, coated steel sheet has long been plagued with the problem of red rusting of the steel substrate. This rusting is caused by poor wetting of the substrate by the coating metal resulting in pin holes or uncoated areas. Red rusting also may be caused by fine iron particles contained in the terne coating metal. There have been numerous proposals to minimize this corrosion by sealing the pin holes with inorganic coatings such as phosphate; chromate; alkali salts of borate, silicate, benzoate or carbonate; zinc sulphite; zinc nitrate; sodium fluoride; and various acidic solutions including sulfuric, phosphoric, hydrochloric, boric, carboxylic, iminodiacetic and nitrilotriacetic. Others have proposed applying organic coatings including epoxy, phenolic, polyester, phthalic acid, fluorine, and silicone to seal the pin holes. These coatings generally have been unsatisfactory because they give only limited corrosion protection, are relatively soluble and/or result in a toxic waste disposal problem. Still others have proposed electroplating a thin nickel coating onto the steel sheet prior to plating the sheet with terne metal. This nickel-terne composite coating has reduced the occurrence of pin holes but has done little for red rusting caused by the corrosion of the fine iron particles contained in the terne metal.

Phosphate conversion coatings are widely used on automotive steels to improve the corrosion performance of painted steel sheets. The corrosion processes of painted steel usually involve high pH conditions at the paint-metal substrate interface. Since phosphate coatings are unstable in an alkaline environment, phosphated steels are rinsed with solutions containing chromium or chromate ions to improve their alkaline stability. However, recent studies suggest the improvement is marginal. Although dry paint adhesion on chromated phosphated steel sheet is good, wet paint adhesion is unacceptable. The bond between the paint-phosphate interface is weak when water or other corrosion species are present.

Chromate coatings have been used to improve corrosion resistance of cold-rolled steel by minimizing red rusting and of galvanized steel by minimizing white rusting. Unfortunately, hexavalent chromium has carcinogenic properties. Because of their toxic nature, rinses containing chromate ions are undesirable for industrial usage.

It also has been proposed previously to improve corrosion resistance and paint adhesion of cold-rolled or galvanized steel sheet using organic polymeric coatings containing a silane and using inorganic coatings including a silane and a silicate.

It also has been proposed to improve alkaline corrosion resistance and paint adhesion of phosphated cold-rolled or galvanized steel sheet using a two step process including rinsing the sheet in an alkaline waterglass solution to form a silicate coating and subsequently rinsing the silicate coated sheet in an aqueous silane containing solution. The sheet first was rinsed for a period of 30 minutes in a 0.005M waterglass solution maintained at room temperature and having a pH of 12. After being blown dry, the silicate coated sheet was rinsed for 5 minutes in 0.5 vol.-% silane solution. The silane solution was prepared by dissolving either $\gamma$-aminopropyltri(m)ethoxy (APS) or $\gamma$-glycidoxypropyltrimethoxy (GPS) silane in an aqueous solution containing acetic acid. The silane treated silicate coating improved the alkaline resistance of phosphate coatings on cold-rolled and galvanized steel, improved the adhesion between the phosphate crystals and paint primer and improved the corrosion resistance of painted steel. Nevertheless, this proposed process has limited industrial application because of the excessive immersion times. Combined immersion times in excess of 30 minutes to apply the silicate coating and the silane treatment are unacceptable for steel sheets which require high speed processing to be cost competitive.

As evidenced by the effort of previous workers, there has been a long felt need to develop a low cost, nontoxic, relatively insoluble, corrosion resistant coating for a steel sheet that is formed using environmentally safe coating solutions that can be disposed of inexpensively. There also has been a need for such a nontoxic coating for preventing corrosion of a terne coated steel sheet. Furthermore, there has been a need for such a nontoxic coating for preventing corrosion and improving paint adherence of cold-rolled or galvanized painted steel sheets.

BRIEF SUMMARY OF THE INVENTION

The invention relates to a steel sheet having a nontoxic, relatively insoluble, inorganic, corrosion resistant coating. A method for coating includes rinsing the sheet for a short period of time in an alkaline aqueous solution having an elevated temperature, the alkaline solution having a silicate and a metal salt, drying the sheet to form a silicate coating, treating the silicate coated sheet in another aqueous solution having a silane.

A principal object of the invention is to provide a nontoxic corrosion resistant coating without using coating solutions or creating waste materials neither of which contain toxic substances.

An additional object includes a method of forming a nontoxic corrosion resistant coating on steel sheet using a high speed processing line.

Additional objects include forming a nontoxic corrosion resistant coating that is relatively insoluble and provides improved adhesion of a painted steel sheet.

A feature of the invention includes rinsing a steel sheet in an alkaline aqueous solution having an elevated temperature to reduce the coating time, the alkaline solution containing a silicate and a metal salt, drying the sheet to form a silicate coating and rinsing the dried sheet in another aqueous solution containing a silane.

Another feature of the invention includes the elevated temperature of the alkaline solution being 25°-60° C.

Another feature of the invention includes rinsing the sheet in the alkaline solution for at least about 30 seconds when the alkaline solution has a pH of at least 10 and a temperature of at least about 45° C.

Another feature of the invention includes the solution having a concentration at least 0.005M for each of the silicate and the metal salt.

Another feature of the invention includes rinsing the sheet for at least about 10 seconds with the silane solution containing at least 1.0 vol.-% silane.

Another feature of the invention includes a combined rinsing time for the alkaline and silane solutions of less than about 90 seconds.

Another feature of the invention includes the silicate coating having a thickness of at least about 2 nm.

Another feature of the invention includes the base metal of the steel sheet being sequentially coated with a zinc or zinc alloy coating and a phosphate coating prior to the silicate coating.

Another feature of the invention includes providing a steel sheet coated with one or more layers of hot-dipped or electroplated metallic coating of lead, lead alloy, nickel or nickel alloy, cleaning the sheet with an acidic solution to activate its surface, rinsing the sheet in an alkaline aqueous solution having an elevated temperature to reduce the coating time, the alkaline solution containing a silicate and a metal salt, drying the sheet to form a silicate coating and rinsing the dried sheet in another aqueous solution containing a silane.

Another feature of the invention includes a steel sheet having a composite coating, the coating including one or more metallic inner layers and an outer silicate layer, the metallic layers being hot-dipped or electroplated lead, lead alloy, nickel and nickel alloy, the silicate layer including a surface film of silane, the silicate layer having a thickness of at least about 2 nm thereby minimizing rusting of the steel sheet.

Advantages of the invention include a corrosion resistant coating applicable to a variety of steel sheet surfaces, no environmentally hazardous waste substances to dispose of and improved paint adherence.

DETAILED DESCRIPTION OF THE PREFERRED EMBODIMENTS

Figure 1:
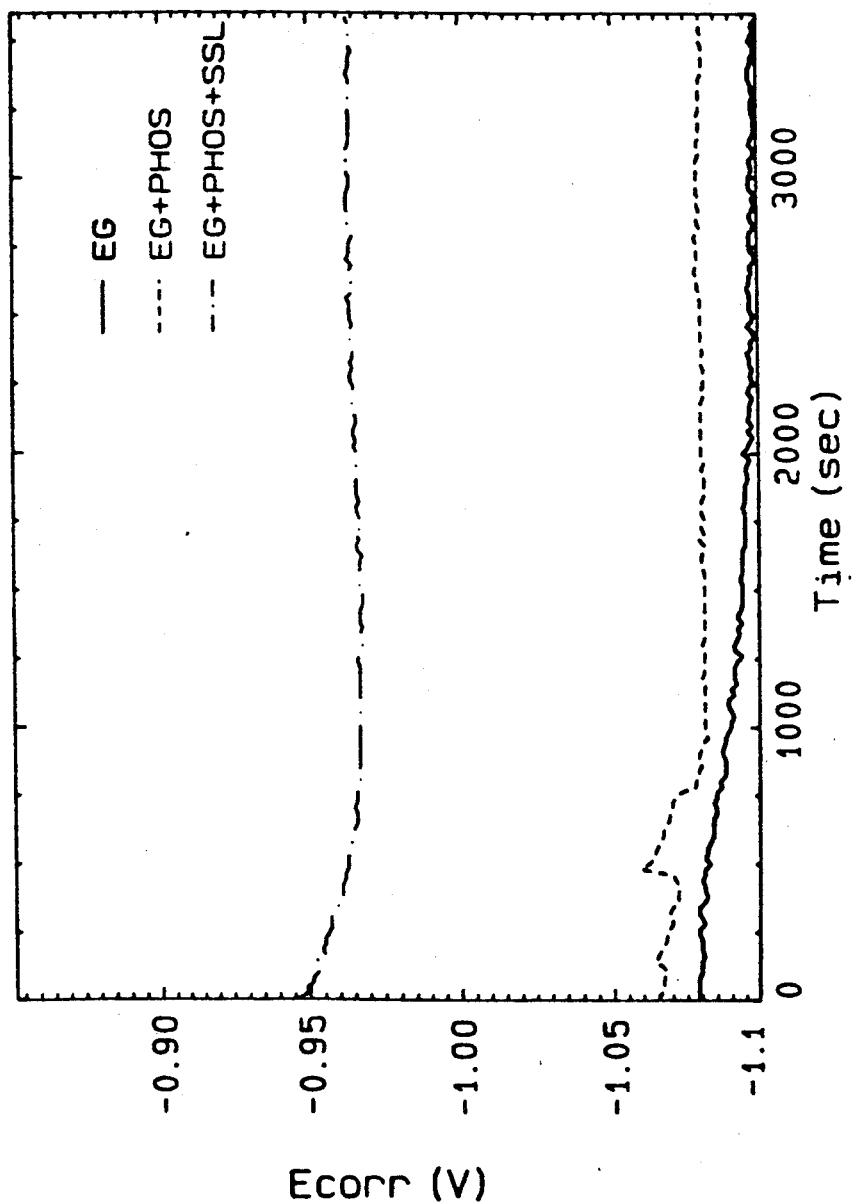
FIG. 1 illustrates the corrosion behavior of phosphated electrogalvanized steel protected with a silane treated silicate coating of the invention when measuring the electrochemical potential of the zinc in a salt solution.

It previously was known to form phosphate coated steel having a silicate coating treated with a silane containing solution. We have determined such a silane treated silicate coating can provide corrosion resistance in industrial applications on a variety of steel substrates by maintaining the alkaline waterglass solution at an elevated temperature to dramatically reduce the coating time. By elevated temperature generally will be understood to include temperatures at least 25° C., preferably at least 45° C. and most preferably 60° C. The corrosion resistant silicate coating of the invention can be applied to hot rolled and pickled steel sheets, cold-rolled steel sheets, and hot-dipped or electroplated metallic coated steel sheets. The metallic coating may include one or more layers of lead, lead alloy, nickel, nickel alloy, zinc, zinc alloy, and the like. By sheet is meant to include continuous strip or foil and cut lengths. The invention has particular utility for cold-rolled and galvanized steel sheets that are to be painted electrostatically with a powder or cathodically electrocoated with a liquid. These painted steel sheets may include a phosphate conversion coating applied to the substrate prior to the silicate coating. The silicate/silane coating improves corrosion protection and strengthens the bond between the paint and the phosphate. If the sheet is coated with a metallic terne coating of lead, lead alloy or nickel-terne, the metallic coated sheet would be first cleaned in an acidic solution to activate uncoated, i.e., pin holes, sheet surface areas and to dissolve any iron fines contained in the metallic coating. The silicate/silane coating improves corrosion protection by passivating the steel and sealing pin holes.

An important aspect of the invention is being able to quickly form a nontoxic, insoluble coating having sufficient thickness to provide long term corrosion resistance. Coating times in excess of 120 seconds generally do not lend themselves to industrial applicability. We determined a corrosion resistant silicate coating having a thickness of at least about 2 nm, preferably at least 10 nm, could be formed in as little as 30 seconds when the waterglass solution temperature was elevated, preferably to at least 45° C. Temperatures greater than 60° C. do not appreciably reduce the coating time. For phosphate coated sheet, the waterglass temperature should not exceed about 60° C. to prevent dissolving of the phosphate crystals when rinsing in the alkaline waterglass solution. At ambient temperature (22° C.) or less, the rate of reaction is reduced with the coating time necessary greatly exceeding 120 seconds. Preferably, the total combined rinsing times of the steel sheet in the waterglass solution and in the silane solution is less than 90 seconds.

In addition to temperature, the rate of reaction for forming the silicate coating also is a function of the alkalinity of the waterglass solution. At a pH less than about 10, the rate of reaction may be too slow to form the minimum coating thickness in a reasonable period of time, particularly when the waterglass temperature approaches ambient. At a pH greater than about 12, the rate of reaction is not increased appreciably. For phosphate coated sheet, the waterglass pH should not exceed 12 to prevent dissolving of the phosphate crystals. The pH may be decreased using $H_3PO_4$ or increased using NaOH or KOH.

Another important parameter for the coating process is the concentration of the silicate in the waterglass solution. The minimum concentration of the silicate is about 0.005M to form a sufficiently thick coating for corrosion resistance with concentrations up to about 0.05M possible. At greater concentrations of waterglass, corrosion and paint adhesion performance are not improved and costs become excessive.

Another requirement is that the waterglass solution include a metal salt. After being formed on the steel sheet, the silicate coating must not be dissolved during subsequently processing or must not be dissolved by the corrosive environment within which the coated sheet is placed. The function of the metal salt is for forming a relatively insoluble silicate coating. We have determined any of the alkaline earth metal salts of $Ba(NO_3)_2$, $Ca(NO_3)_2$ or $Sr(NO_3)_2$ are acceptable for this purpose. Since the metal salt reacts in direct proportion with the dissolved silicate, the concentration of the salt should at least equal the concentration of the dissolved silicate. Accordingly, an acceptable concentration of the metal salt is about 0.005–0.05M.

No particular immersion time, temperature or pH is required for the silane solution so long as the silane is adsorbed onto the outer surface of the silicate coating.

For steel sheets to be painted, the silane is adsorbed onto the silicate coating and provides a primary bond between the paint to the silicate. For steel sheets not painted, the silane stabilizes the silicate, i.e., less reactive in an alkaline environment. Possible silanes include γ-glycidoxypropyltrimethoxy (GPS), γ-aminopropyltrie(m)thoxy (APS), γ-methacryloxypropyltrimethoxy (MPS) and N-[2-(vinylbenzylamino)ethyl]-3-aminopropyltrimethoxy (BPS). Except as discussed below, any of these silanes could be used with the examples below with APS and BPS being preferred. It will be understood other silanes may be used with the invention. To be used as a rinse for forming a continuous film on a silicate coating, a silane is dissolved into an aqueous solution in concentrations of 0.5-5 vol.-% by being acidified. The silane concentration should be at least about 0.5 vol.-% because below this concentration the film thickness may be insufficient. The silane film thickness should be about 1-10 nm and preferably about 5 nm. A silane thickness of about 1 nm is necessary to properly seal and/or tightly bond paint to the silicate coating. A silane concentration above about 5 vol.-% is undesirable because wettability with the silicate is diminished, cost is increased and a silane thickness greater than 10 nm may result. Such a thick silane film is undesirable because it is brittle.

By way of examples, the invention now will be described in detail.

EXAMPLE 1

A low carbon deep drawing steel strip was electroplated with 70 g/m² of pure Zn on each side and then passed through a bath containing a conventional zinc phosphate conversion coating. A waterglass solution was prepared having a concentration of 0.005M silicate, 0.005M Ca(NO$_3$)$_2$, the pH was adjusted to 12 using NaOH and was heated to an elevated temperature of 60° C. Test panels of the phosphated electrogalvanized steel were cut from the strip and placed in the waterglass solution without any chromate treatment. After being in the waterglass for 30 seconds, the test panels were removed, dried in air for 5 minutes at 20° C. and then rinsed in different 1 vol.-% aqueous silane solutions of MPS, GPS, APS and BPS for 20 seconds. The pure silanes were hydrolyzed with acetic acid at 20° C. and diluted to 1.0 vol.-% in water. The silane treated silicate coated panels then were cathodically coated with a primer, cured at 171° C. for 30 minutes and then coated with a standard automotive Basecoat/Clearcoat paint system. The total paint thickness was about 100 μm. The painted panels were scribed and exposed for four weeks to the standard GM (General Motors Corporation) scab corrosion test. Corrosion and paint adherence results of phosphated electrogalvanized steels having a silicate coating sealed with a silane are summarized in Table 1.

TABLE 1

| Treatment | Ave. Paint Delamination From Scribe (mm) | NMPRT* |
|---|---|---|
| Phos** + Chromate | 2.0 | 4 |
| Phos** + Silicate + MPS | 3.0 | 5 |
| Phos** + Silicate + GPS | 2.0 | 60 |
| Phos** + Silicate + APS | 1.6 | 8 |
| Phos** + Silicate + BPS | 1.5 | >180 |
| Silicate + Heat + Water + BPS | 7.0 | |
| Silicate | 6.6 | |

TABLE 1-continued

| Treatment | Ave. Paint Delamination From Scribe (mm) | NMPRT* |
|---|---|---|
| None | 3.9 | |

*NMPRT is a measure of paint adherence to the substrate using N-methyl pyrrolidone as a swelling solvent to remove the paint. This test is described in a paper authored by applicants published in the proceedings of PRETREAT '90 and titled "A RESEARCH LOOK AT THE EFFECT OF PRETREATMENT ON THE CORROSION RESISTANCE OF AUTOMOTIVE SHEET STEELS", pages 5-1 to 5-26, Cincinnati, Ohio, November 6-8, 1990, incorporated herein by reference.
**Phos is a standard zinc phosphate conversion coating.

Phosphated electrogalvanized steels coated with silicate and treated with MPS, GPS, APS and BPS silane had an average paint delamination of 3.0 mm, 2.0 mm, 1.6 mm and 1.5 mm respectively as measured by the scab test. This compared very favorably to an average paint delamination of 2.0 mm for a Phos+Chromate treated galvanized steel. The Phos+Chromate sample was for a phosphated electrogalvanized steel rinsed in an acidic solution containing hexavalent chromium. This is a well known rinse applied to phosphated electrogalvanized steel prior to painting for enhancing corrosion resistance. An average paint delamination of 2.0 mm is typical for chromate treated steel with any delamination less than 3 mm being considered acceptable corrosion performance on this test. By way of further comparison, an electrogalvanized steel without the phosphate pretreatment was coated with a BPS silane treated silicate coating. After being coated with the silicate, the steel was cured at a temperature of 150° C. for 15 minutes. The steel then was rinsed in water, dried, treated with BPS silane and painted. This silicate cured sample performed poorly in the scab test and had an average paint delamination of 7.0 mm. By way of further comparison, two additional electrogalvanized steels were tested. One sample received the silicate coating but without any silane film prior to painting while the other sample received no treatment prior to painting. Neither of these latter two samples were phosphated. These samples also performed poorly in the scab test and had average paint delaminations of 6.6 mm and 3.9 mm respectively.

The results of this test clearly demonstrated that phosphated galvanized steel sheets coated with a silicate coating and sealed with a silane provide paint corrosion protection as good as a conventional chromate treatment. We determined treatment times could be dramatically reduced by increasing the temperature of the silicate solution to well above ambient. For example, increasing the treatment temperature to 40° C. reduced the time to about 1 minute and further increasing the treatment temperature to 55°-60° C. reduced the time to 20-30 seconds. The next to last sample listed in Table 1 also demonstrated the importance of the silane treatment. Without being sealed with a silane having sufficient film thickness, a silicate coating does not provide good paint corrosion protection.

The silane treated samples and the Phos+Chromate sample also were evaluated for paint adherence using an internal test, e.g., NMPRT. This test demonstrated that phosphated galvanized steels coated with a silicate coating and sealed with a silane provide paint adherence (≧5) as good as a conventional chromate treatment (4). The steels treated with GPS and BPS silane had paint adherence (≧60) much better than the chromate treated steel.

FIG. 1 shows graphically the corrosion behavior of the phosphated electrogalvanized steel coated with the BPS silane treated silicate from Table 1 (Phos+Silicate+BPS). The electrochemical potential was measured as a function of time after placing the samples in an aerated solution containing 3.5 wt.-% NaCl. The lower curve for the untreated electrogalvanized steel (EG) had a potential of about −1.10 volts. The middle curve for the phosphated electrogalvanized steel rinsed in an acidic solution containing hexavalent chromium (EG+PHOS) had a potential of about −1.08 volts. The upper curve for the phosphated electrogalvanized steel treated with the silicate/silane (EG+PHOS+SSL) had a potential of about −0.96 volts. The silicate/silane coating increased the potential closer to that for steel clearly demonstrating that a zinc coating corrodes more slowly then it otherwise would with no pretreatment or with a phosphate chromate treatment.

By way of additional examples, the invention now will be demonstrated for minimizing red rust for terne coated steel.

EXAMPLE 2

Low carbon deep drawing steel strips were hot-dip coated with 75 g/m² of terne coating on both sides of the strip with the composition of the coating being about 8 wt.-% tin and the balance essentially lead. Blanks from these steels were to be formed into automotive gasoline tanks. However, the steel was rejected by the customer for failure to pass salt spray corrosion tests. Test panels cut from the steel were etched with an acidic aqueous solution containing 5 wt.-% phosphoric acid for 30 seconds. This acid rinse was found to be necessary to activate any uncoated portion of the steel substrate, i.e., pin hole, exposed to the atmosphere and to remove any iron fines that may be present in the surface of the terne coating. The etched samples were rinsed in water and then placed in an aqueous waterglass solution. The waterglass solution had a concentration of 0.005M silicate, 0.005M Ba(NO₃)₂, had its pH adjusted to 12 by adding NaOH and then was heated to an elevated temperature of 50° C. After being in the waterglass solution for 30 seconds, the silicate coated test panels were removed, dried and placed for various times, e.g., 15, 30 and 45 seconds, in an aqueous solution of APS silane having a temperature of 22° C. The silicate coated panels then were removed from the silane containing solution and dried. The silane was hydrolyzed with acetic acid at 22° C. and diluted to 0.5 vol.-% in water. The silane treated silicate coated panels were exposed to a standard salt spray test (SST) for various times and then evaluated for red rust using ASTM D610.

EXAMPLE 3

In another test, the evaluation described for Example 2 was repeated except the temperature of the waterglass solution was reduced to 45° C. and the rinse time in the waterglass solution was increased to 60 seconds.

EXAMPLES 4 AND 5

In another test, the evaluations described for Examples 2 and 3 respectively were repeated except Ca(NO₃)₂ was substituted for the Ba(NO₃)₂ in the waterglass.

EXAMPLES 6-9

In another test, the evaluation described above for Examples 2-5 was repeated except test panels were electrocoated with 1.2-1.4 g/m² of nickel on each side then hot-dipped with 75 g/m² of terne coating on both sides with the composition of the terne being 8 wt.-% tin and the balance essentially lead.

The results of the tests are summarized in Table 2. Test panels for Examples 2-9 treated with the silane sealed silicate coatings of the invention are compared using ASTM D610 to terne and nickel-terne coated panels respectively not given any surface treatment for red rust corrosion protection.

TABLE 2

| Example | Sample | Time In Silane (sec.) | SST Time (hrs.) | ASTM Rating (%)* Treated | Not Treated |
|---|---|---|---|---|---|
| 2 | Terne | 15 | 44 | 5 | >50 |
|   |   | 30 | 24 | .04 | 30 |
|   |   | 30 | 144 | 3.5 | >50 |
|   |   | 30 | 240 | 7 | — |
|   |   | 45 | 144 | 3 | >50 |
| 3 | Terne | 45 | 24 | .3 | 30 |
| 4 | Terne | 30 | 24 | .05 | >50 |
| 5 | Terne | 45 | 24 | .5 | >50 |
| 6 | Ni-Terne | 30 | 24 | <.03 | 3 |
|   |   | 30 | 168 | .04 | — |
|   |   | 30 | 240 | 2 | — |
| 7 | Ni-Terne | 45 | 24 | .03 | — |
| 8 | Ni-Terne | 15 | 240 | .3 | 30 |
|   |   | 30 | 240 | .15 | 25 |
| 9 | Ni-Terne | 45 | 24 | .05 | — |

*Each of the ASTM ratings was an average of at least 6 panels.

The results for Examples 2-5 clearly demonstrate that terne coated steel protected with silane sealed silicate coatings have much better red rust protection (≦7%) then terne coated steels without any additional protection (≧30%). The results for Examples 6-9 demonstrate that Ni-terne coated steel protected with silane sealed silicate coatings had much better red rust protection (≦2%) then terne coated steels without any additional protection (≧3%).

It will be understood various modifications can be made to the invention without departing from the spirit and scope of it. Various concentrations, rinse times and temperatures for alkaline waterglass and hydrolyzed silane solutions can be used. Therefore, the limits of the invention should be determined from the appended claims.

We claim:

1. A method of coating steel with a nontoxic, inorganic, corrosion resistant coating, comprising the steps of:
   providing an alkaline aqueous solution maintained at an elevated temperature,
   said alkaline solution including corrosion resistant amounts of a silicate and a metal salt,
   rinsing a steel sheet with said alkaline solution,
   drying said sheet thereby forming a relatively insoluble silicate coating,
   rinsing said silicate coated sheet in another aqueous solution, the other solution including a corrosion resistant amount of a silane.

2. The method of claim 1 wherein said elevated temperature is at least 45° C.

3. The method of claim 1 wherein said alkaline solution has a silicate concentration of at least 0.005M.

4. The method of claim 1 wherein said sheet is rinsed in said alkaline solution at least about 30 seconds.

5. The method of claim 1 wherein the combined rinsing time for said sheet in said alkaline solution and said silane solution is less than about 90 seconds.

6. The method of claim 1 wherein alkaline solution has a pH of at least 10.

7. The method of claim 1 wherein said metal salt is from the group consisting of $Ba(NO_3)_2$, $Ca(NO_3)_2$ and $Sr(NO_3)_2$.

8. The method of claim 1 wherein said silane solution has a concentration of 0.5–5.0 vol.-% silane.

9. The method of claim 1 wherein said silane is from the group consisting of γ-aminopropyltri(m)ethoxy, γ-glycidoxypropyltrimethoxy, γ-methacryloxypropyltrimethoxy and N-[2-(vinylbenzylamino)]-3-aminopropyltrimethoxy.

10. The method of claim 1 including the additional step of painting said silane treated sheet.

11. The method of claim 1 wherein said silicate coating has a thickness of at least about 2 nm.

12. The method of claim 1 wherein said silane film has a thickness of at least about 1 nm.

13. The method of claim 1 wherein the base metal of said sheet is coated with hot-dipped or electroplated zinc or zinc alloy including the additional steps of:
providing a phosphate containing solution,
rinsing said sheet with said phosphate solution prior to said silicate coating.

14. The method of claim 1 wherein said elevated temperature is no greater than about 60° C. and the pH of said alkaline solution is about 10–12, including the additional steps of:
providing a phosphate containing solution,
rinsing said sheet with said phosphate solution prior to said silicate coating, and
painting said silane treated sheet.

15. A method of coating steel with a nontoxic, inorganic, corrosion resistant coating, comprising the steps of:
providing an alkaline solution maintained at an elevated temperature,
said alkaline solution being aqueous and including a silicate and a metal salt,
said alkaline solution having a pH of at least about 10 and the concentration of each of said silicate and said salt being at least about 0.005M,
rinsing a steel sheet with said alkaline solution,
drying said sheet thereby forming a relatively insoluble silicate coating,
rinsing said silicate coated sheet in another solution,
the other solution being aqueous and including a concentration of 0.5–5.0 vol.-% silane.

16. A method of coating steel with a nontoxic, inorganic, corrosion resistant coating, comprising the steps of:
providing an alkaline solution maintained at an elevated temperature of about 25°–60° C.,
said alkaline solution being aqueous and including a silicate and a metal salt,
said alkaline solution having a pH of about 10–12 and the concentration of each of said silicate and said salt being at least about 0.005M,
rinsing a steel sheet with said alkaline solution,
drying said sheet thereby forming a relatively insoluble silicate coating having a thickness of at least 2 nm,
rinsing said silicate coated sheet in another aqueous solution,
the other solution being aqueous and including a concentration of 0.5–5.0 vol.-% silane, and
painting said silane treated sheet.

17. A method of coating steel with a nontoxic, inorganic, corrosion resistant coating, comprising the steps of:
providing a steel sheet and an acidic solution,
said sheet including one or more layers of hot-dipped or electroplated metallic coating of lead, lead alloy, nickel and nickel alloy,
rinsing said sheet with said acidic solution,
providing an alkaline aqueous solution maintained at an elevated temperature,
said alkaline solution including a silicate and a metal salt,
rinsing said sheet with said alkaline solution,
drying said sheet thereby forming a relatively insoluble silicate coating,
rinsing said silicate coated sheet in another aqueous solution,
the other solution including a silane wherein said silicate coating minimizes rusting of said metallic coated sheet.

18. A method of coating steel with a nontoxic, inorganic, corrosion resistant coating, comprising the steps of:
providing a steel sheet and an acidic solution,
said sheet including one or more layers of hot-dipped or electroplated metallic coating of lead, lead alloy, nickel and nickel alloy,
rinsing said sheet with said acidic solution,
providing an alkaline aqueous solution maintained at an elevated temperature,
said alkaline solution having a pH of at least about 10 and including about 0.005M of a silicate and about 0.005M of a metal salt,
rinsing said sheet with said alkaline solution,
drying said sheet thereby forming a relatively insoluble silicate coating,
rinsing said silicate coated sheet in another solution,
the other solution being aqueous and including a concentration of 0.5–5.0 vol.-% silane wherein said silicate coating minimizes rusting of said metallic coated sheet.

19. A method of coating steel with a nontoxic, inorganic, corrosion resistant coating, comprising the steps of:
providing a steel sheet and an acidic solution,
said sheet including one or more layers of hot-dipped or electroplated metallic coating of lead, lead alloy, nickel and nickel alloy,
rinsing said sheet with said acidic solution,
providing an alkaline aqueous solution maintained at an elevated temperature of about 25°–60° C.,
said alkaline solution having a pH of 10–12 and including about 0.005M of a silicate and about 0.005M of a metal salt,
rinsing said sheet with said alkaline solution,
drying said sheet thereby forming a relatively insoluble silicate coating having a thickness of at least 2 nm,
rinsing said silicate coated sheet in another solution,
the other solution being aqueous and including a concentration of 0.5–5.0 vol.-% silane wherein said silicate coating minimizes rusting of said metallic coated sheet.

* * * * *